United States Patent [19]

Hollenbeak et al.

[11] Patent Number: 4,693,639

[45] Date of Patent: Sep. 15, 1987

[54] CLAY STABILIZING AGENT PREPARATION AND USE

[75] Inventors: Keith H. Hollenbeak; Paul S. Brown, Jr., both of Duncan, Okla.

[73] Assignee: Halliburton Company, Duncan, Okla.

[21] Appl. No.: 878,160

[22] Filed: Jun. 25, 1986

[51] Int. Cl.$^4$ .............................................. E02D 3/12
[52] U.S. Cl. .................................... 405/263; 166/293; 252/8.551; 405/264
[58] Field of Search .................. 405/263, 264, 266; 166/293, 294; 106/900

[56] References Cited

U.S. PATENT DOCUMENTS

| | | | |
|---|---|---|---|
| 3,912,693 | 10/1975 | Shimizu et al. | 522/168 |
| 4,366,071 | 12/1982 | McLaughlin et al. | 252/8.55 R |
| 4,366,072 | 12/1982 | McLaughlin et al. | 252/8.55 R |
| 4,366,073 | 12/1982 | McLaughlin et al. | 252/8.55 R |
| 4,366,074 | 12/1982 | McLaughlin et al. | 252/8.55 R |
| 4,374,739 | 2/1983 | McLaughlin et al. | 252/8.55 R |
| 4,460,483 | 7/1984 | Weaver | 252/8.55 R |
| 4,462,718 | 7/1984 | McLaughlin et al. | 405/264 |
| 4,497,596 | 2/1985 | Borchardt et al. | 405/263 |
| 4,536,305 | 8/1985 | Borchardt et al. | 252/8.55 R |

*Primary Examiner*—Dennis L. Taylor
*Attorney, Agent, or Firm*—Robert A. Kent

[57] ABSTRACT

Methods of preparing and using a clay stabilizing agent are provided. The agent is prepared by polymerizing diallyldimethylammonium chloride with sulfur dioxide in the presence of a polymerization reaction rate retarder to form a solid cationic copolymer having a high sulfur content. When dissolved in an aqueous carrier fluid, the copolymer is particularly effective in preventing clay swelling and/or fines migration.

7 Claims, No Drawings

CLAY STABILIZING AGENT PREPARATION AND USE

BACKGROUND OF THE INVENTION

1. Field of the Invention

The present invention relates generally to clay stabilizing agents useful in subterranean formation treating, and more particularly, to the preparation and use of a water soluble clay stabilizing agent.

2. Description of the Prior Art

The production of hydrocarbons from subterranean formations is often troubled by the presence of clays and other fines, which can migrate with produced fluids and plug off or restrict the flow of such fluids. The migration of fines in a subterranean formation is generally the result of clay swelling and/or the disturbance of normally quiescent fines by the introduction of water foreign to the formation therein. Typically, the foreign water is introduced into the formation in completing and/or treating the formation to stimulate production of hydrocarbons therefrom such as fracturing, acidizing and other treatments utilizing aqueous fluids.

A variety of clay stabilizing agents have been developed and used heretofore to control the ill effects of water on clay and/or other fines in subterranean formations containing hydrocarbons. For example, inorganic polycationic polymers or complexes have been utilized as clay stabilizing agents. Ions contained in the clay are replaced by the inorganic polycationic polymers or complexes thereby transforming the clays into relatively non-swelling forms. Such inorganic polycationic polymers or complexes have been successful in controlling swelling clays, but have various limitations. For example, two commonly used inorganic polycationic polymers are zirconyl chloride ($ZrOCl_2$) and aluminum hydroxychloride ($Al(OH)_xCl_y$). Aluminum hydroxychloride requires a cure time after it is placed in the presence of the clay. Also, aluminum hydroxychloride can tolerate only a limited amount of carbonate material in the formation and is removed by contact with acids such as when a subsequent acid treatment of the formation is necessary. Zirconyl chloride is limited in the pH range of the placement fluid and can also be removed by acid under certain conditions.

Organic polycationic polymers have also been utilized for stabilizing clays or migrating fines or combinations thereof. For example, U.S. Pat. Nos. 4,336,071; 4,366,072; 4,366,073; 4,366,074; 4,374,739; 4,460,483; and 4,462,718, all assigned to the assignee of this present invention, disclose the use of organic polycationic polymers as clay stabilizing agents. U.S. Pat. Nos. 4,497,596 and 4,536,305, also assigned to the assignee of this invention, disclose water soluble organic polycationic polymers containing two or three quaternary ammonium moieties in the monomer repeat units.

Organic cationic polymers have achieved great success as clay stabilizing agents in that they are effective when dissolved in aqueous treating fluids in small concentrations, they resist removal by most subsequent acid and other treatments and result in long life stabilization of formation clays and fines. However, all of the heretofore used organic cationic polymers are hygroscopic and are available for use only as dilute aqueous solutions. Thus, there is a need for a highly effective clay stabilizing agent which can be prepared and used as a concentrated aqueous solution or a non-hygroscopic solid which can be readily dissolved in aqueous fluids.

By the present invention, methods of preparing a concentrated aqueous solution of a highly effective clay stabilizing agent or such agent in a solid non-hygroscopic form are provided as well as methods of using such agent for reducing clay swelling and fines migration in subterranean formations.

SUMMARY OF THE INVENTION

A method of preparing a water soluble clay stabilizing agent comprising polymerizing diallyldimethylammonium chloride with sulfur dioxide in the presence of a polymerization reaction rate retarder is provided. The resulting copolymer has a high sulfur content, i.e., a nitrogen-to-sulfur mole ratio of about 1 and is a highly effective clay stabilizing agent. A method of reducing clay swelling and fines migration in a clay containing subterranean formation using the copolymer clay stabilizing agent is also provided.

The cationic copolymers prepared and used in accordance with this invention are very effective in treating swelling clays such as clays in the smectic group including clay minerals such as montmorillonite, beidellite, nontromite, saponite, hectorite and sauconite, and fines such as silica and iron minerals, e.g., hematite, magnetite, lepidocrocite, wuestite, akaganeite and siderite. Also, alkaline earth metal carbonates such as calcite and dolomite are effectively treated. The cationic copolymer clay stabilizing agent of this invention is effective when added to aqueous treating fluids in small concentrations, is essentially permanent and is very resistant to being removed by brines, oils and acids. Permeable structures, such as subterranean formations, exhibit high permeability retention after being treated with the cationic copolymer stabilizing agent of this invention and no well shut-in time is required after treatment.

DETAILED DESCRIPTION OF THE PREFERRED EMBODIMENT

The present invention involves the preparation and use of a water soluble clay stabilizing agent comprised of a copolymer of diallyldimethylammonium chloride and sulfur dioxide to prevent or reduce clay swelling and fines migration in permeable subterranean formations. The method of use is carried out by contacting swellable clays and migratable fines or combinations thereof with an effective amount of the aforesaid copolymer having a molecular weight in the range of from about 1000 to about 100,000, and preferably from about 3000 to about 20,000, having a nitrogen-to-sulfur mole ratio of about 1, and having the structural formula:

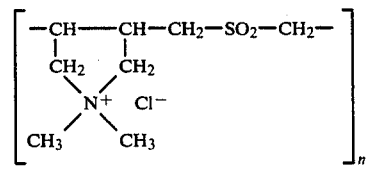

The water soluble copolymer clay stabilizing agent is prepared by polymerizing diallyldimethylammonium chloride with sulfur dioxide. The polymerization reaction is carried out in an aqueous solution containing a polymerization reaction rate retarder whereby the resulting copolymer has a high sulfur content, i.e., a nitrogen-to-sulfur mole ratio in the range of from about 1.0 to about 1.4, preferably about 1.

Particularly suitable polymerization reaction retarders are erythorbic acid salts such as sodium erythorbate and sodium ascorbate. Of these, sodium erythorbate is the most preferred. Other polymerization reaction retarders which can be utilized are erythorbic acid and ascorbic acid.

In carrying out the polymerization reaction, an aqueous solution of diallyldimethylammonium chloride, the polymerization reaction rate retarder used and an initiator such as ammonium peroxydisulfate is first prepared. The solution is then contacted with sulfur dioxide gas under controlled temperature conditions whereby the polymerization reaction takes place. Preferably, the cationic copolymer product is precipitated and then dried in a vacuum oven to produce a solid product. It is to be understood, however, that the concentrated liquid reaction product can be utilized directly as a liquid additive to a treatment fluid.

The solid copolymer product is a white powder which is non-hygroscopic and can be stored and transported in bags or other convenient containers. The copolymer has a high sulfur content, i.e., a nitrogen-to-sulfur mole ratio in the range of from about 1.0 to about 1.4, and is an excellent clay stabilizing agent as shown by the examples which follow. The most preferred clay stabilizing agent of this invention has a nitrogen-to-sulfur mole ratio of about 1.

In using the cationic copolymer clay stabilizing agent of the present invention for preventing or reducing clay swelling and fines migration in a clay containing subterranean formation, the formation and the clays and fines therein are contacted with the agent in any suitable manner. The cationic copolymer agent attaches to clay surfaces in the formation and converts the clays into relatively nonswelling forms thereby preventing or reducing swelling and fines migration.

In a preferred method of using the water soluble clay stabilizing agent of the present invention, the agent is dissolved in an aqueous carrier fluid in an effective amount, and the fluid is then introduced into the formation. The particular amount of the agent required to be effective will vary according to, for example, the size and porosity of the particular formation and the types of fines present therein. However, the agent is generally dissolved in the carrier fluid in a concentration within the range of from about 0.1% to about 2.0% by weight of the carrier fluid. While lower or higher concentrations can be used, they are generally not practical. The preferred concentration of the clay stabilizing agent in an aqueous carrier fluid is in the range of from about 0.15% to about 0.5% and most preferably of from about 0.17% to about 0.35% by weight of the carrier fluid.

Examples of suitable carrier fluids which can be utilized include water, brine, aqueous mixtures of low molecular weight alcohols, ketones and monoethers of glycol. The aqueous carrier fluid can contain other ingredients which do not substantially interfere with the dissolution of the stabilizing agent in the carrier fluid. Furthermore, the carrier fluid can be gelled or thickened for certain applications using gelling agents such as natural gums, cellulose derivatives and polymers. Other ingredients include salts, mineral acids such as hydrochloric acid or hydrofluoric acid or mixtures thereof, low molecular weight organic acids, cationic or nonionic surfactants, and wetting agents.

A particularly suitable aqueous carrier fluid is a saline solution containing about 0.1 to about 40.0 percent by weight salt. The preferred salt concentration is about 2 to about 12 percent by weight of the solution. The salt can be an alkali metal salt, an alkaline earth metal salt, an ammonium salt or mixtures thereof. Suitable anions include halides, fluorides, sulfates, carbonates, hydroxides, or mixtures thereof. Aqueous acids having a concentration in the range of from about 0.1 to about 40.0 percent by weight of the solution can also be utilized as carrier fluids. Examples of suitable acids include hydrochloric acid, hydrofluoric acid, phosphoric acid, acetic acid, formic acid, citric acid, and mixtures thereof. Preferred acid carrier fluids include from about 3% to about 15% by weight of hydrochloric acid and a mixture of about 3% by weight of hydrofluoric acid and about 12% by weight hydrochloric acid.

When the carrier fluid is a saline aqueous treating fluid containing a gelling agent, the solid cationic copolymer clay stabilizing agent is preferably dissolved therein in an amount in the range of from about 0.2% to about 0.3% by weight of the fluid. When the aqueous treating fluid contains an acid, the clay stabilizing agent is preferably dissolved therein in an amount in the range of from about 0.2% to about 0.4% by weight of the fluid.

The method of the present invention can be used in a number of subterranean formation treating operations. For example, the method can be used in conjunction with well completion procedures, sand consolidation procedures, gravel packing procedures, secondary recovery operations, and acidizing, fracturing and other similar operations. In these operations, the stabilizing agent is used to prevent or reduce the swelling of clays and/or migration of fines or combinations thereof, This in turn results in a greater permeability in the subterranean formations involved.

The use of the clay stabilizing agent of the present invention, i.e., the cationic copolymer of diallyldimethylammonium chloride and sulfur dioxide having a high sulfur content, preferably a nitrogen-to-sulfur mole ratio of about 1, is particularly advantageous in carrying out treatments in subterranean formations. Because the agent is a non-hygroscopic solid, it can be transported to the well site and stored in bags or other convenient containers until used. When used, the solid agent is readily dissolvable in aqueous carrier or treating fluids using conventional equipment.

In order to further illustrate the invention and facilitate a clear understanding thereof, the following examples are given.

EXAMPLE 1

A solid clay stabilizing agent of the present invention is prepared as follows. A 250 milliliter graduated cylinder containing a magnetic stirring bar, a thermometer, and a gas dispersion tube connected to a nitrogen source is placed in an ice-water bath. To the cylinder are added 150 grams of a 64% by weight aqueous solution of diallyldimethylammonium chloride, 0.15 gram of sodium erythorbate retarder, and 0.60 gram of ammonium peroxydisulfate initiator. The mixture is stirred and sparged with nitrogen while the temperature is lowered to about 10° C. The gas tube is disconnected from the nitrogen source and reconnected to a sulfur dioxide source and the liquid volume in the cylinder is noted. Sulfur dioxide gas is passed into the cylinder very slowly so that at no time does the temperature exceed 25° C. When the liquid volume has increased by 30 milliliters, gas introduction is stopped. The reaction mixture is transferred to a jacketed beaker containing a magnetic stirring bar and a thermistor which is connected to a temperature controller. The temperature controller functions to regulate a solenoid valve controlling the circulation of chilled water through the jacket of the beaker whenever the reaction temperature reaches 40° C. With this arrangement, a reaction temperature variation of 2° C. is maintained during the exothermic stage. The reaction mixture is warmed and at about 25° C., the polymerization reaction exotherm commences and continues for several hours as the viscosity of the reaction mixture increases. After the exotherm has subsided, the chilled water is replaced with tap water and the reaction is allowed to continue for about 12 additional hours. The product is then precipitated by pouring the reaction mixture into a blender containing a 1:1 methanol-acetone mixture. After drying in a vacuum oven at 35°-40° C., a 90% yield of copolymer is obtained as a white powder. An analysis of the powder indicates the copolymer contains 5.45% nitrogen and 12.42% sulfur which corresponds to a nitrogen-to-sulfur mole ratio of about 1.

The procedure described above is repeated except that the sodium erythorbate retarder is omitted. The polymerization exotherm begins soon after sulfur dioxide is first introduced into the graduated cylinder and the product produced has a low sulfur content, i.e., a nitrogen-to-sulfur mole ratio of 1.425.

EXAMPLE 2

Tests are performed to determine the effectiveness of the cationic copolymer formed in accordance with the procedure described in Example 1 as a swelling clay stabilizer.

The test equipment is comprised of a TEFLON®-sleeved test chamber of a design and shape which insures that fluid injected into the chamber flows through particulate material therein rather than around the material. A 100 U.S. mesh screen is placed at the base of the chamber to hold particulate material therein. The material contained in the chamber is comprised of 10 grams of Oklahoma No. 1 sand (70-170 U.S. mesh); 60 grams of a mixture of 85.0% Oklahoma No. 1 sand (70-170 U.S. mesh), 10.0% silica (Ca.270 U.S. mesh), and 5.0% Wyoming bentonite; 10 grams of Oklahoma No. 1 sand (70-170 U.S. mesh); and 20 grams of a coarse sand (20-40 U.S. mesh). Fluids are forced through the chamber at 145° F. using an applied pressure of 50 psig.

A standard laboratory brine is prepared by mixing 7.5 weight percent sodium chloride, 0.55 weight percent calcium chloride, 0.42 weight percent magnesium chloride hexahydrate, and 91.53 weight percent fresh water. The brine is injected through the test chamber until a stable flow rate is achieved. The chamber is then treated with 200 milliliters of 2% ammonium chloride water containing the desired concentration of clay stabilizing agent to be tested. A filtered API brine is next flowed through the chamber until a stable flow rate is achieved. This step determines the effectiveness of the clay stabilizing agent in stopping clay swelling and/or migrating. Fresh water is next flowed through the chamber until a stable flow rate is achieved. This step also determines the effectiveness of the clay stabilizing agent in stopping the clay (bentonite) from swelling and/or migrating. 400 milliliters of 15% by weight hydrochloric acid are next flowed through the chamber followed by the injection of fresh water until a stable flow rate is achieved. The purpose of the acid and fresh water injections is to determine if acid treatment detrimentally affects the clay stabilization ability of the clay stabilizing agent tested.

The percent flow rate retentions of the sand and clay to brine, fresh water and fresh water after acid are calculated based upon the initial flow rate of filtered standard brine. The results of these tests are given in Table I for various concentrations of clay stabilizing agent. Also given in Table I for comparison purposes are standard specifications for an values achievable using an organic polycationic polymer type of clay stabilizing agent at a concentration of 0.39% by weight in 2% ammonium chloride water. The results of these tests are given in Table I below.

TABLE I

| Clay Stabilizing Agent | Clay Stabilizing Agent Concentration in 2 wt. % NH4Cl Solution (wt. %) | % Flow Rate Retention to Brine | % Flow Rate Retention to Brine | % Flow Rate Retention to Fresh Water After Acid |
|---|---|---|---|---|
| Standard Specifications for Organic Cationic Polymer Type of Clay Stabilizing Agent | 0.39 | 100 | 100 | 75 |
| Cationic Copolymer of Present Invention with N:S Mole Ratio of 1.004 | 0.40 | 106 | 118 | 120 |
| Cationic Copolymer of Present Invention with N:S Mole Ratio of 1.004 | 0.35 | 100 | 115 | 112 |
| Cationic Copolymer of Present Invention with N:S Mole Ratio of 1.004 | 0.30 | 107 | 115 | 117 |
| Cationic Copolymer of Present Invention with N:S Mole Ratio of 1.004 | 0.25 | 105 | 117 | 121 |
| Cationic Copolymer of Present Invention with N:S Mole Ratio of 1.004 | 0.20 | 95 | 105 | 109 |
| Cationic Copolymer of Present Invention with N:S Mole Ratio of 1.004 | 0.175 | 95 | 98 | 98 |
| Cationic Copolymer of Present Invention with | 0.15 | 102 | 86 | 70 |

TABLE I-continued

| Clay Stabilizing Agent | Clay Stabilizing Agent Concentration in 2 wt. % NH₄Cl Solution (wt. %) | % Flow Rate Retention to Brine | % Flow Rate Retention to Brine | % Flow Rate Retention to Fresh Water After Acid |
|---|---|---|---|---|
| N:S Mole Ratio of 1.004 | | | | |

From Table I it can be seen that the clay stabilizing agent of the present invention very effectively prevents the swelling of clay.

EXAMPLE 3

The procedure set forth in Example 2 above is repeated utilizing clay stabilizing agents of the present invention, one of which has a higher sulfur content than the other. The results of these tests are given in Table II below.

TABLE II

| Clay Stabilizing Agent | Clay Stabilizing Agent Concentration in 2 wt. % NH₄Cl Solution (wt. %) | % Flow Rate Retention to Brine | % Flow Rate Retention to Fresh Water | % Flow Rate Retention to Fresh Water After Acid |
|---|---|---|---|---|
| Cationic Copolymer of Present Invention with N:S Mole Ratio of 1.004 | 0.425 | 97.6 | 109.4 | 96.5 |
| Cationic Copolymer of Present Invention with N:S Mole Ratio of 1.159 | 0.425 | 87.4 | 99.7 | 77.3 |

From Table II it can be seen that the cationic copolymer of diallyldimethylammonium chloride and sulfur dioxide having the highest sulfur content achieves the best clay stabilization flow test results.

What is claimed is:

1. A method of preparing a water soluble clay stabilizing agent comprising polymerizing diallyldimethylammonium chloride with sulfur dioxide, said polymerization being carried out in an aqueous solution in the presence of a polymerization reaction rate retarder comprising an erythorbic acid salt to form a copolymer having the structural formula:

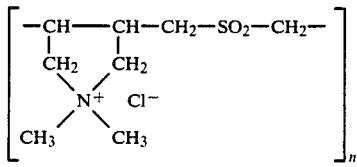

and having a nitrogen-to-sulfur mole ratio in the range of from about 1.0 to about 1.4 and n is an integer equal to the numbers of repeating units in the polymer required to give a molecular weight in the range of from about 1000 to about 100,000.

2. The method of claim 1 wherein said erythorbic acid salt is sodium erythorbate.

3. A method of reducing clay swelling and fines migration in a clay containing subterranean formation comprising contacting said formation with a clay stabilizing agent comprised of a copolymer of diallyldimethylammonium chloride and sulfur dioxide having the structural formula:

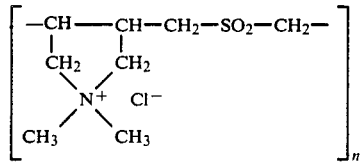

and a nitrogen-to-sulfur mole ratio in the range of from about 1.0 to about 1.4 and n is an integer equal to the number of repeating units in the polymer required to give a molecular weight in the range of from about 1000 to about 100,000.

4. The method of claim 3 wherein the step of contacting said formation with said clay stabilizing agent comprises dissolving said clay stabilizing agent in an aqueous treating fluid followed by introducing the aqueous treating fluid containing said dissolved clay stabilizing agent into said formation.

5. The method of claim 3 wherein said clay stabilizing agent is dissolved in said aqueous treating fluid in an amount in the range of from about 0.15% to about 0.5% by weight of said fluid.

6. The method of claim 3 wherein said aqueous treating fluid contains a gelling agent and said clay stabilizing agent is dissolved therein in an amount in the range of from about 0.2% to about 0.3% by weight of said treating fluid.

7. The method of claim 3 wherein said aqueous treating fluid contains an acid and said clay stabilizing agent is dissolved therein in an amount in the range of from about 0.2% to about 0.4% by weight of said fluid.

* * * * *